INVENTORS
WARREN D. MOON
RICHARD J. WEINER
BY COOCH AND O'CONNELL
ATTORNEYS

INVENTORS
WARREN D. MOON
RICHARD J. WEINER
BY COOCH AND O'CONNELL
ATTORNEYS

INVENTORS
WARREN D. MOON
BY RICHARD J. WEINER
BY COOCH AND O'CONNELL
ATTORNEYS

INVENTORS
WARREN D. MOON
RICHARD J. WEINER

BY COOCH AND O'CONNELL
ATTORNEYS

United States Patent Office 3,489,996

Patented Jan. 13, 1970

3,489,996

SIGNAL PROCESSING SYSTEM

Warren D. Moon and Richard J. Weiner, Norwood, Mass., assignors to Real Time Geophysics, Inc., Norwood, Mass., a corporation of Massachusetts Filed July 29, 1968, Ser. No. 748,314

Int. Cl. G01v *1/16*

U.S. Cl. 340—15.5 9 Claims

ABSTRACT OF THE DISCLOSURE

A signal processing system for processing an input signal which includes a primary information, or message, signal and one or more periodically repetitive forms of said primary signal. The signal processing system which is particularly useful in processing marine seismic signals includes a unique combination of analogue and digital computation means for producing an output signal in which distortion effects produced by the presence of such repetitive forms are eliminated.

This invention relates generally to signal processing systems and, more particularly, to systems for processing an input signal which contains a primary desired signal and one or more undesired, periodically repetitive, or reverberating, forms thereof, such system thereby producing an output signal in which the effects of such reverberating signal forms are eliminated.

Although it is understood that the signal processing system of this invention will find use in many different applicatons in which reverberating signal distortion is a problem, its application in marine seismic profiling systems will be discussed in detail to depict one specific embodiment of its successful employment.

In many applications an incoming data signal which is to be processed for subsequent use or analysis comprises a message, or primary signal, that is, a signal which contains the desired data information, together with one or more "echo" signals which are in effect periodically repeated forms of the primary signal. Thus, it is necessary to process such incoming signal in such a manner as to remove the effects of the reverberating portions thereof and, thus, to extract substantially only the desired message or information contained therein. In marine seismic reflection profiling systems, which are used to obtain a continuous record of the geological profile of sedimentary layers at and below a water layer, the data obtained is often unusable as received in its raw form because of distortions which arise as a result of reverberations of the primary signal occurring within the water layer itself. Although such seismic signals include other distortion effects, the water layer reverberations usally tend to far overshadow signal distortions arising from all other sources. Such echos, or repetitive forms, of the desired primary acoustic signal are, thus, superimposed on the primary signal and obscure the useful data contained therein. Consequently, a processing system designed to remove the effects of water layer reverberation signals is of prime necessity in marine seimic applications.

Processing systems available for marine profiling work prior to the system of our invention have resorted to the use of relatively elaborate and expensive data reduction techniques in order to remove water layer reverberation effects. Such previously known systems, after converting the received acoustic signals to electrical signals by appropriate transducer elements, usually initially store the received signals in digital form on magnetic tape or other suitable storage means. The stored digital signals are not processed on board the ship but are normally returned to a land based data processing center when the ship returns to port. An extensive digital computation system is then employed to reduce the stored data appropriately so as to extract therefrom useful information concerning the geological profile by removing in the first instance water layer reverberation distortion effects. This overall process is not only expensive and extremely time consuming but, more importantly, provides no immediately useful information on board ship at the time the data is being gathered. If, as is often the case, the observers, after analyzing the reduced data, wish to re-examine more closely any particular geological area about which data has been gathered, the ship must be re-outfitted and sent back to the desired location which may be geographically far removed from the data reduction center itself. Such an operation further increases the time, expense and effort involved in getting the desired information.

Apart from its independent use, the processing system of this invention will find frequent use as an adjunct to such land based data processing systems. For example, the system of the invention may be used to screen raw data on the spot before such data is returned for subsequent more extensive land based processing. In this way much of the information which has been gathered can be subjected to a preliminary analysis so that subsequent data reduction performed with more elaborate processing equipment can be made more effective and meaningful. Moreover, the system of the invention can be used in a reconnaissance operation where it is desirable to obtain a broad and relatively rapid examination of a large number of geographical locations of potential interest prior to making a full scale, and more detailed, investigation of certain selected ones of such locations. The subsequent full scale investigation may then utilize a more elaborate land based data reduction process. Thus, a more efficient overall information gathering procedure can be planned and developed before being launched on a full scale basis.

A specific embodiment of this invention, in contrast to large, land based data reduction equipment, utilizes a relatively less expensive method, and equipment for implementing such method, for suitably processing, essentially directly upon receipt, incoming seismic signals so that the water layer reverberation or echoing effects are essentially removed and the processed signal can be made available in real time for immediate display or use on board ship. As used herein, the expression "real time" refers to a processing time arranged so that the desired output information is made available within a relatively short time from the time at which the incoming signal is introduced into the signal processing system of the invention for appropriate processing. Accordingly, the expression "real time" includes, for example, a processing time in which the calculations required to produce the desired output information from a particular segment of incoming information are completed before the next incoming information segment is made available for processing. Thus, in a pulsed system, such as will be described in more detail with reference to a specific embodiment of a marine seismic profiling system, real time processing refers to processing which is faster than the repetition rate of the energy pulses used therein. Further, the expression "real time" processing is not meant to exclude a processing procedure wherein the incoming information-containing signal is retained or stored for later introduction into and processing by the signal processing system of the invention.

Such inventive method and appropriate inventive apparatus for performing the same makes use of a combination of analog and digital computations which can be performed by high speed and high quality equipment of relatively small size capable of being carried and operated directly at the point of receipt of a signal to be processed. The digital computational elements perform the time delaying, information storage, and logic control operations required in the processing of the incoming signal, as described in more detail later, while the analog computational elements perform the mathematical operations required in such processing, as described also in more detail later. Appropriate conversion elements are supplied to change the signals involved in such processing from digital to analog forms, and vice versa, where needed. The unique combination of digital and analog means provides an extremely efficient overall processing system.

The basis for the improved operation of such a system and a specific instrumentation technique for implementing the desired system operation can be better understood with the help of the accompanying drawings wherein.

Figure 1:
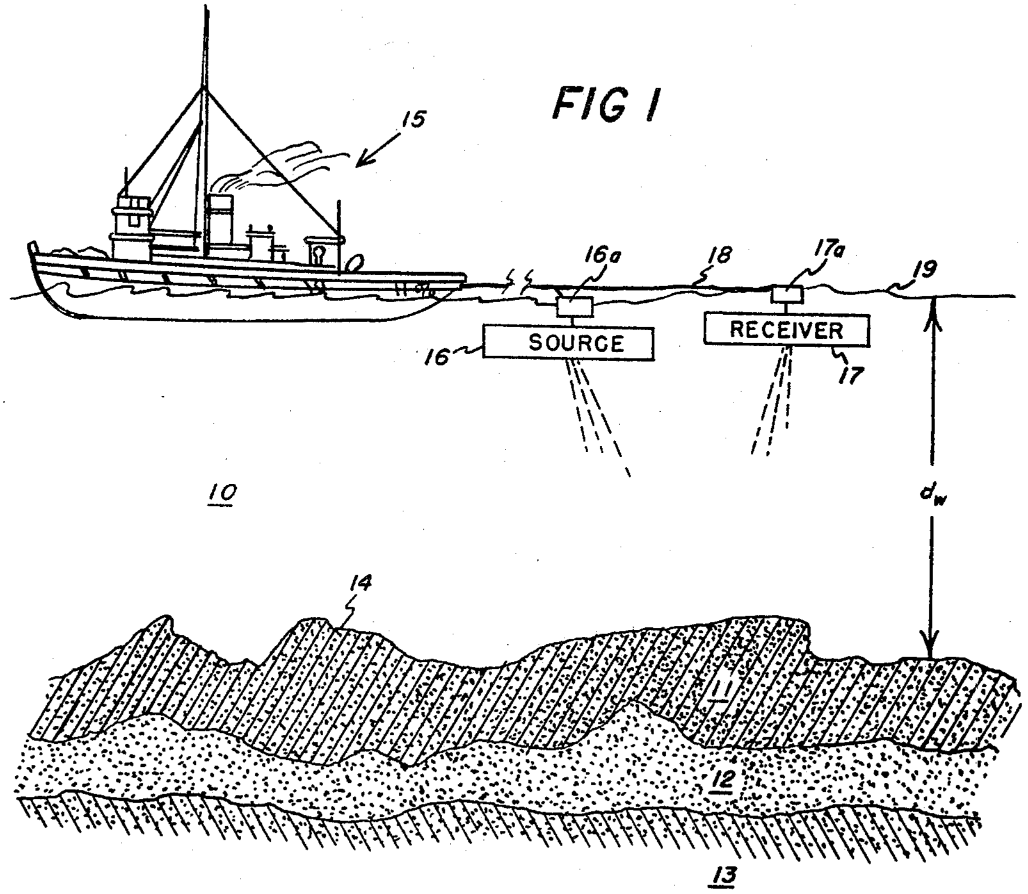
FIG. 1 is a partial-schematic, partial-pictorial drawing showing the geometric relationship between a ship, which tows acoustic source and receiver units comprising part of an overall marine seismic profiling system, and the water and sedimentary layers, the profiles of which are to be determined.

In depicting the operation of the system of the invention as used in processing a marine seismic signal, a brief discussion of the environment in which such marine profiling system is used is first given as background for defining certain terminology used in the subsequent description of such embodiment of the invention. In FIG. 1 a water layer 10, for example, the ocean, is shown as located above one or more sedimentary layers represented by layers 11, 12 and 13 as shown. The interface between water layer 10 and upper sedimentary layer 11 is referred to in the figure as the ocean bottom 14. A ship 15 is utilized to tow a source 16 of acoustical energy, which provides an impulse signal for reflection from the sedimentary layer interfaces therebelow, and a receiver unit 17. Commonly, source 16 will generate an omnidirectional, nearly impulsive signal the transmitted energy pattern of which is relatively complicated, as is well known. A receiver unit 17 is also towed by the ship in the general vicinity of source 16 and receives signals reflected from such sedimentary layers as well as other reflected signals including the reverberating echo signals mentioned above and discussed more fully below.

The source and receiver units 16 and 17 are towed by an appropriate tow line 18 which includes suitable buoys or floats **16*a* and 17*a***, well known in the art and capable of adjusting and monitoring the depths of such units, and the necessary signal and power cables for operating such units. The ship is adapted to carry on board the signal processing system of the invention (not shown in this figure but shown in other figures and described in more detail below) for providing an appropriate output signal which represents the geological profile of the sedimentary layer interfaces beneath the water. Such output signal and other signals supplied by the system of the invention can then be displayed on board ship by suitable recording and display units (also not shown) as desired.

The distance $d_w$ represents the depth of the water layer and, as seen in the figure, such depth varies as the ship moves over ocean bottom 14. The signal derived from source 16 and received at receiver 17 has a relatively complicated waveform due to various distortion effects the most important of which is that due to the presence of reverberation signals representing the reflections of energy between upper water-air interface 19 and ocean bottom interface 14.

An understanding of such reverberation distortion effects and of the characteristics of the water layer in which such reverberations occur can be found in the article "Water Reverberations—Their Nature and Elimination" by Milo Backus, Geophysics, vol. 24, 1959, pp. 233–261. As explained in that article, a water layer may be considered as an acoustic filter, the filtering characteristics of which can be expressed in the frequency domain as:

$$W(\omega)=[1+Re^{-j\omega\tau_w}]^{-1} \qquad (1)$$

where $W(\omega)$ is the frequency domain transmission response of such water layer, $\omega$ is the frequency expressed in radians, R is the reflection coefficient of the water bottom, that is, the reflection coefficient at the interface 14 of the water layer bottom and the upper surface of the top sedimentary layer below the water, and $\tau_w$ is the two-way acoustical travel time in the water layer, that is, the time of travel of a sound signal from the top of the water layer (i.e., the water layer-air interface 19) to the bottom of the water-layer (i.e., the water layer-top sedimentary layer interface 14) and back again. The value of $\tau_w$ is thus an effective measure of the water layer depth $d_w$ and, as used herein, also may be referred to as the effective reverberation depth or the "reverberation trap depth."

Since the acoustic energy signal passes through the water layer twice, that is, once when the energy is transmitted from the sound source down to the reflective layers and once again when the energy is returned back through the water layer to the receivers, the filtering effect of the water layer acts twice upon the acoustic energy signal. The total filtering effect, as expressed in the frequency domain, is, thus, given by the following equation:

$$[W(\omega)]^2=[1+Re^{-j\omega\tau_w}]^{-2} \qquad (2)$$

If $F_p(\omega)$ is defined in the frequency domain as the desired primary reflection waveform signal, that is, the signal which would be received at the receivers if there were no water layer reverberations present, and if $F_r(\omega)$ is defined in the frequency domain as the actual waveform signal which is received at the receivers, that is, the total received signal which includes the water layer reverberations, the relationship between $F_p(\omega)$ and $F_r(\omega)$ can be expressed in terms of the filtering characteristics of the water layer by the following equation:

$$F_r(\omega)=F_p(\omega)[W(\omega)]^2 \qquad (3)$$

In the system of this invention, in order to obtain the desired primary waveform signal $F_p(\omega)$, the received waveform signal $F_r(\omega)$ is processed through an appropriate inverse filter the characteristics of which are determined by the above designated characteristics in accordance with the following equation:

$$F_p(\omega)=F_r(\omega)[1+Re^{-j\omega\tau_w}]^2 \qquad (4)$$

Figure 2:
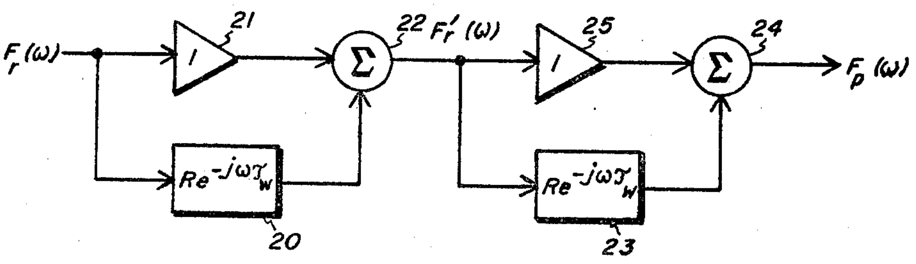
FIG. 2 shows a block diagram of a filter structure utilized in a preferred embodiment of the signal processing system of the invention.

One form of such a filtering technique is shown schematically in FIG. 2 wherein the received signal $F_r(\omega)$ is fed through a first filter 20 having the filter characteristics $[Re^{-j\tau\omega_w}]$, as shown, the output of filter 20 being fed to one input of a summation network 22. The received signal $F_r(\omega)$ is also fed directly (i.e., with unity gain as represented by block 21) to another input of summation network 22 to produce an intermediate signal, designated for convenience as $F_r'(\omega)$. The latter signal is then fed to a similar network combination in which $F_r'(\omega)$ is supplied to a second filter 23 having a filter characteristic identical to that of filter 20, the output of filter 23 being fed to an input of a summation network 24. $F_r'(\omega)$ is also fed directly (again with unity gain as represented by block 25) to another input of summation network 24 and the output thereof then represents the desired primary waveform $F_p(\omega)$.

In order to perform the above processing of the received signal, the filter characteristics of filters 20 and 23 must be adapted to adjust to any changes in the values of the reflection coefficient R and of the two-way travel time $\tau_W$ which occur as the ship filter characteristics change as a is, the overall water layer filter characteristics change as a function of time in accordance with changes in R and $\tau_W$ as the acoustic system moves above the ocean bottom. Hence, in order to implement the filter characteristics shown in FIG. 2, it is necessary that the system of this invention provide means for appropriately changing the filter characteristics so that the overall system is automatically adapted to produce continuously the correct inverse filter characteristics at all times. The discussion which follows shows the basis for devising an appropriate method of performing this operation.

Figure 3:
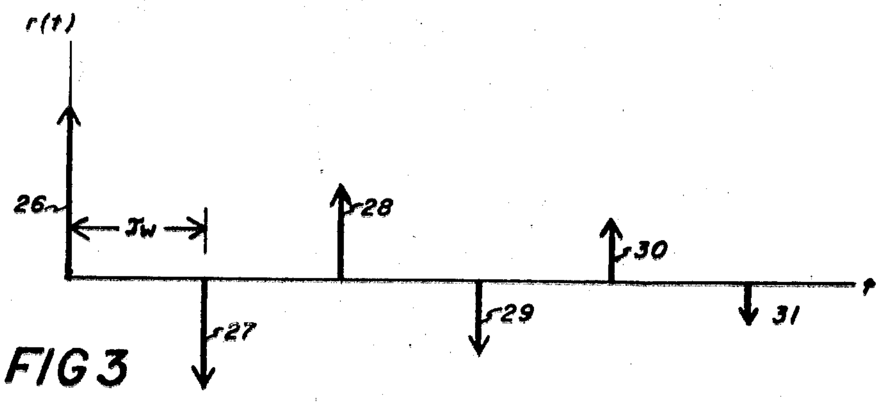
FIG. 3 is a graph showing the impulse response, $r(t)$, of the filter characteristics of the water layer shown in FIG. 1.

An inverse Fourier transformation from the frequency domain to the time domain can be performed with reference to Eq. 2 to provide a time domain expression for the impulse response, herein defined as $r(t)$, of the water layer filter. A graphical illustration of $r(t)$ is shown in FIG. 3 and includes a plurality of periodic impulses having gradually diminishing amplitudes (the decrease in amplitude as a function of time occurs only if the reflection coefficient R has a value less than unity, a condition which always exists in any practical situation). As seen in FIG. 3, if the initial impulse 26 is normalized at an amplitude of unity, succeeding impulses 27, 28, 29, 30, 31, etc. can be expressed as having the gradually diminishing amplitudes 2R, $3R^2$, $4R^3$, $5R^4$, $6R^5$, etc., respectively, as shown. The impulses are each separated by a time duration equal to the two-way travel time, $\tau_W$, as also shown in the figure.

A waveform signal $f_p(t)$ designates the desired primary reflection waveform signal in the time domain [corresponding to the frequency domain designation $F_p(\omega)$], which signal is defined as the signal which would be received at the receivers if there were no water layer reverberations present. A waveform signal $f_r(t)$ designates in the time domain the actual waveform signal received at the receivers [such signal corresponds to the frequency domain expression $F_r(\omega)$]. The article "Multi Channel Z-Transforms and Minimum Delays" by E. A. Robertson, Geophysics, vol. 31, 1966, pp. 482–500 shows that the convolution of the functions $r(t)$ and $f_p(t)$ produces the function $f_r(t)$. Such convolution relationship is expressed by the following equation:

$$f_r(t)=\int_{-\infty}^{+\infty} f_p(t)r(t-\tau)d\tau \qquad (5)$$

where the quantities are defined above.

Since the primary waveform $f_p(t)$ can be considered as a random function, whereas $r(t)$ is a periodic function having a frequency $\frac{1}{2}\tau_W$, the autocorrelation function, $\phi_{rr}(\tau)$, of the received waveform $f_r(t)$ essentially equals the autocorrelation function of $r(t)$ multiplied by an appropriate constant A. Such relationships are expressed by the following equations:

$$\phi_{rr}(\tau)=\int_{-\infty}^{+\infty} f_p(t)f_r(t-\tau)dt \qquad (6)$$

$$\phi_{rr}(\tau)=A\int_{-\infty}^{+\infty} r(t)r(t-\tau)dt \qquad (7)$$

Figures 4, 5:
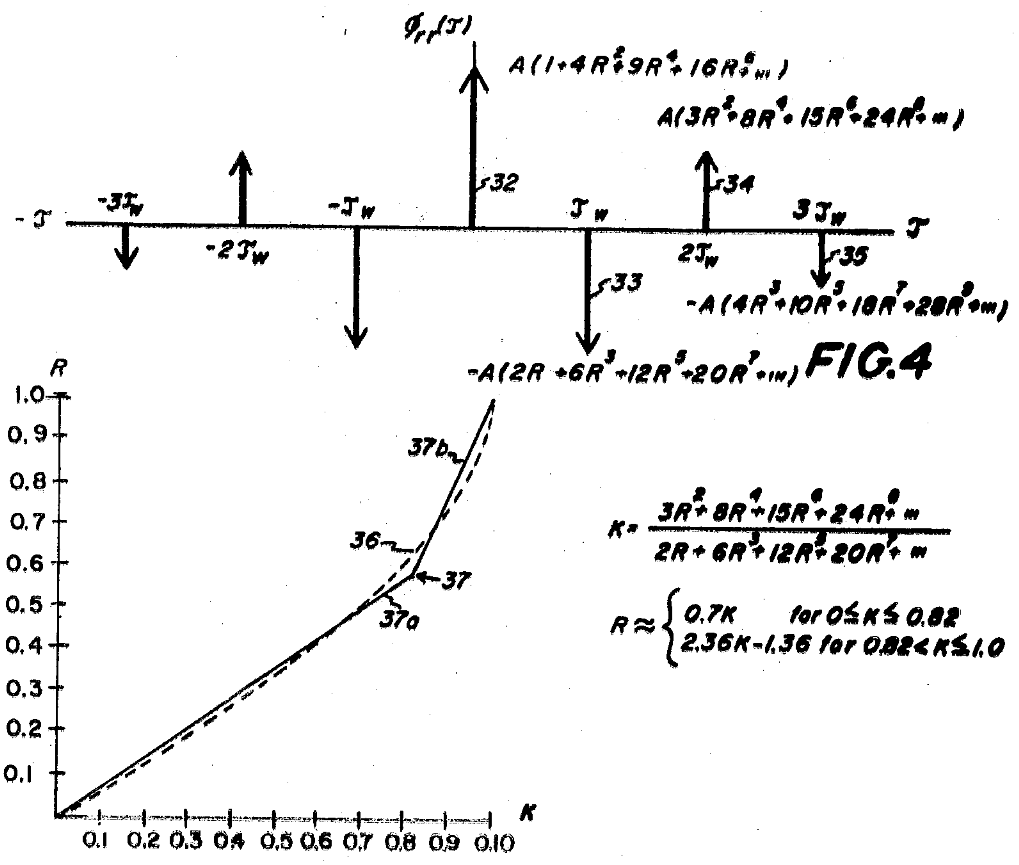
FIG. 4 is a graph showing the autocorrelation function $\phi_{rr}(\tau)$ used in the signal processing system of the invention.
FIG. 5 is a graph of the reflection coefficient R as a function of the ratio K, as defined below, and a piecewise linear approximation thereto.

A graphical representation of the autocorrelation function, $\phi_{rr}(\tau)$, is shown in FIG. 4. In actual practice the amplitude 32 of the function $\phi_{rr}(\tau)$ at $\tau=0$ is not exactly equal to the value shown in FIG. 4 since at that point any noise which may exist in the received wave form signal also correlates and contributes to the amplitude value at such point. At subsequent points (i.e., at $\tau_W$, $2\tau_W$, $3\tau_W$, etc.) the noise obviously will not correlate and the values of the impulse amplitudes 33, 34, 35, etc. of $\phi_{rr}(\tau)$ at such points are as shown in FIG. 4. Thus, to avoid any problem which may arise due to noise correlation at $\tau=0$, this invention, as explained in more detail below, preferably makes use of a determination of the amplitudes of $\phi_{rr}(\tau)$ as found at $\tau_W$ and at $2\tau_W$ in the evaluation of the reflection coefficient R.

The amplitudes of the autocorrelation function $\phi_{rr}(\tau)$ at $\tau_W$ and at $2\tau_W$ are expressed by the following equations:

$$\phi_{rr}(\tau=\tau_W)=-A(2R+6R^3+12R^5+20R^7+\dots) \qquad (8)$$

$$\phi_{rr}(\tau=2\tau_W)=A(3R^2+8R^4+15R^6+24R^8+\dots) \qquad (9)$$

A plot of the value K of the ratio of the amplitude at $2\tau_W$ (Eq. 9) divided by the amplitude at $\tau_W$ (Eq. 8) is shown by the dashed line curve 36 in FIG. 5. A very good approximation of dashed line curve 36 is shown by the solid line curve 37 in FIG. 5 which represents a piecewise linear approximation formed by the two straight line segments 37*a* and 37*b*. Such approximation is expressed by the equation:

$$R=\begin{cases}0.7K \text{ for } 0\leq K\leq 0.82\\ 2.36K-1.36 \text{ for } 0.82<K\leq 1.0\end{cases} \qquad (10)$$

By computing and suitably processing the autocorrelation function $\phi_{rr}(\tau)$, continuous computations of the values of R and $\tau_W$ can be obtained. Thus, if the value of the ratio of the amplitudes of $\phi_{rr}(\tau)$ at $2\tau_W$ and $\tau_W$ is calculated and multiplied by an appropriate factor in accordance with Eq. 10, R is determined and, if the time between any two impulses of the autocorrelation function is appropriately determined, $\tau_W$ can be found.

A method for processing the received signal $f_r(t)$ in order to obtain the desired primary waveform signal $f_p(t)$ can then be expressed by the following steps.

First, a real time calculation of the autocorrelation function $\phi_{rr}(\tau)$ of the received waveform $f_r(t)$ is made.

Second, the value of $\tau_W$ is obtained by determining the time of occurrence, relative to the time at $\tau=0$, of the largest negative value of $\phi_{rr}(\tau)$, i.e., the time of occurrence of negative impulse 33 in FIG. 4.

Third, the amplitude of $\phi_{rr}(\tau)$ at $\tau_W$ is determined, i.e., the amplitude of negative impulse 33 in FIG. 4.

Fourth, the amplitude of $\phi_{rr}(\tau)$ at $2\tau_W$ is determined, i.e., the amplitude of the largest positive impulse 34 (other than that at $\tau=0$), as shown in FIG. 4.

Fifth, the ratio of the amplitude value of $\phi_{rr}(\tau)$, as found at $2\tau_W$, to that, as found at $\tau_W$, is calculated to produce the value of K.

Sixth, the value K is multiplied by an appropriate factor, as determined by the solid line piecewise approximation curve 37 in FIG. 5, in order to compute R in accordance with Eq. 10.

Seventh, the received waveform signal $f_r(t)$ is added to a replica of such received waveform signal, which has been delayed in time by $\tau_W$ and multiplied by R, to produce an intermediate signal $f_r'(t)$. This summation performed in the time domain corresponds to the summation expressed in the frequency domain as performed by summation network 22 of FIG. 2.

Eighth, the waveform signal [i.e., intermediate signal $f_r'(t)$] resulting from the above step is added to a replica of such waveform signal which has been delayed in time by $\tau_W$ and multiplied by R. This summation performed in the time domain is equivalent to the summation expressed in the frequency domain as performed by summation network 24 of FIG. 2.

The result of the last summation above is the desired primary waveform signal $f_p(t)$, that is, the received waveform signal with the water layer reverberation effects removed.

Figure 6:
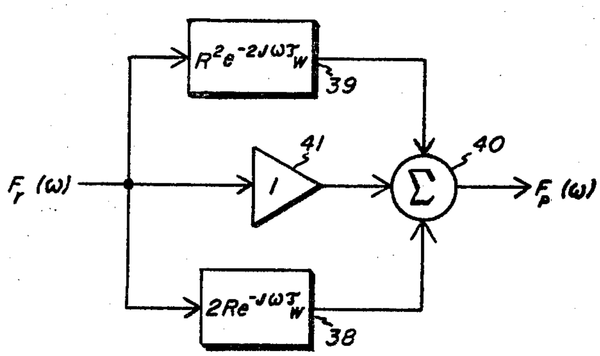
FIG. 6 shows a block diagram of an alternate filter structure capable of being used in the signal processing system of the invention.

As an alternative to the systems shown in FIG. 2 for producing the desired waveform signal, the system depicted in the frequency domain in FIG. 6 may also be utilized. Such system is based on an expansion of the bracketed expression in Eq. 4 which produces the following equation:

$$F_p(\omega)=F_r(\omega)[1+2Re^{-j\omega\tau w}+R^2e^{-j2\omega\tau w}] \quad (11)$$

As can be seen in FIG. 6, the received waveform $F_r(\omega)$ is simultaneously fed to two separate filters 38 and 39 which have filter characteristics expressed by $2Re^{-j\omega\tau w}$ and $R^2e^{-j2\omega\tau w}$, respectively, as shown. The outputs of filters 38 and 39 are fed to two input terminals of a summation network 40. The received signal $F_r(\omega)$ is also fed directly (i.e., with unity gain as represented by block 41) to a third input of summation network 40 so that the output signal from such summation is the desired primary waveform signal $F_p(\omega)$ with the water layer reverberation effects removed, a result similar to that provided by the system shown in FIG. 2. In the case of the network combination of FIG. 6, as in the case of that shown in FIG. 2, the values R and $\tau_w$ can be appropriately and continuously calculated so that the filter characteristics can adaptively change in accordance with the changing values of such quantities as a function of time.

Figure 7:
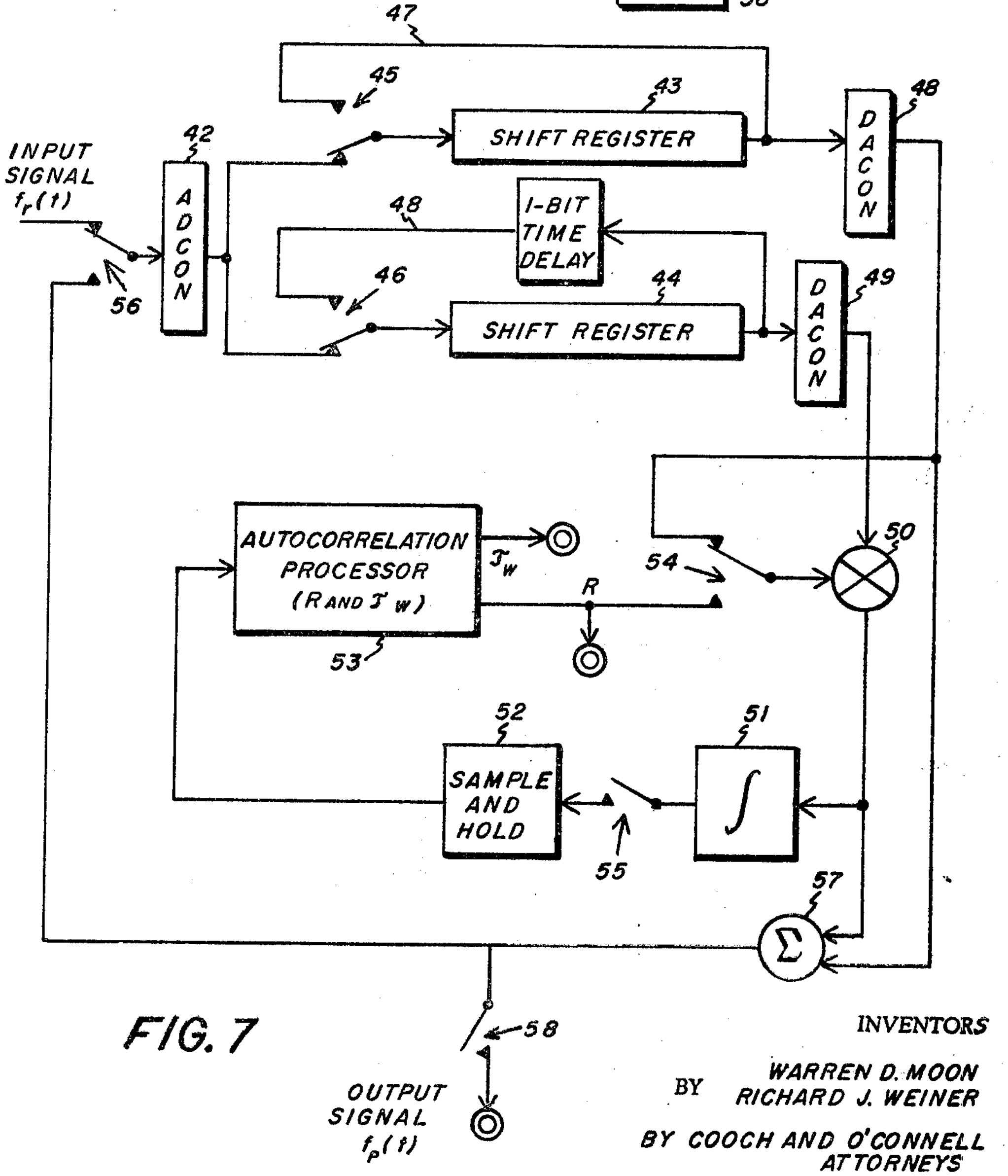
FIG. 7 shows a block diagram of a simplified version of a preferred embodiment of the signal processing system of the invention.

A simplified block-diagram drawing of a preferred embodiment of an apparatus for implementing the system discussed with reference to FIGS. 2–5 is shown in FIG. 7, the details of the system of FIG. 7 being depicted in FIG. 8.

In FIG. 7 the received input signal $f_r(t)$ which has been converted from acoustical to electrical form is fed through a switch 56 to an analog to digital converter (ADCON) 42 so that the received signal can be utilized initially in a digital form when generating certain functions required for computing the autocorrelation function $\phi_{rr}(\tau)$.

The output of converter 42 is fed to a pair of digital shift registers 43 and 44 through appropriate switches 45 and 46 which are initially in the positions shown in the figure. When the input signal $f_r(t)$ in digital form has been loaded into the shift registers, switches 45 and 46 are placed in their alternate positions and the contents of each register are recirculated about closed loop paths 47 and 48 associated with registers 43 and 44, respectively. Closed loop path 47 recirculates the content of its shift register without change while closed loop path 48 introduces a time delay of 1 time bit during each recirculation. Thus, shift registers 43 and 44 operate to produce in digital form the signal $f_r(t)$ repeatedly available at the output of register 43 and a plurality of successive time-delayed signals $f_r(t-nT)$, where $n$ is successively equal to 0, 1, 2, 3, . . . N time bits and T is equal to the ratio of the load time of the shift registers to the bit length of such registers, available at the output of register 44. The output signals from registers 43 and 44 are converted to analog form by digital to analog converters (DACON) 48 and 49 whereupon such signals are appropriately multiplied at multiplier 50, the signal from converter 48 being fed to the multiplier via a switch 54 in the position as shown. The output from multiplier 50 is integrated at integrator 51, the output signal from which is fed a sample and hold circuit 52 to produce the autocorrelation function $\phi_{rr}(\tau)$, which is substantially of the form shown in FIG. 4.

The next step in the computation process is to determine the amplitude of the largest negative impulse of the autocorrelation function, corresponding to the impulse which occurs at time $\tau_w$, and that of the largest positive impulse (other than the impulse at $\tau=0$) corresponding to the impulse which occurs at time $2\tau_w$. In addition, the time at which the largest negative impulse occurs must also be determined, that is, the time duration from $\tau=0$ to the time at $\tau_w$. Such determinations are performed in an appropriate autocorrelation processor 53 which is described in more detail in FIG. 8 and which produces signals representing the reflection coefficient R and the two way travel time $\tau_w$. For this operation switch 54 is in the position shown in the figure and switch 55 is in its closed position.

Having thus computed the appropriate values of reflection coefficient R and two-way travel time $\tau_w$, the next operation performed by the system is the filtering operation discussed above with reference to FIG. 2. For this purpose the input signal $f_r(t)$ is again loaded into shift registers 43 and 44 via switches 56, 45 and 46. The input signal is then time delayed by an amount equal to $\tau_w$ in shift register 44 so as to produce the signal $f_r(t-\tau_w)$ at the output of register 44. Register 43 provides the undelayed input signal $f_r(t)$. The signal from register 44 is converted to analog form at converter 49 and is then fed to one input of multiplier 50, the other input to which is supplied with the signal representing the reflection coefficient R via switch 54 which for this purpose is placed in its alternate position. The output of multiplier 50 is then added at summation network 57 to the input signal $f_r(t)$ obtained at the output of shift register 43 which has been also converted to analog form by converter 48. The output of summation network 57 then represents the intermediate signal $f_r'(t)$ discussed above with reference to FIG. 2. Intermediate signal $f_r'(t)$ is thereupon loaded into shift registers 43 and 44 via switch 56 (now in its alternate position) and switches 45 and 46 (both now in their positions as shown), switch 58 being placed in its open position at this time. The content of shift register 44 is again recirculated as above to provide a time delay equivalent to $\tau_w$ thereby producing at the output of register 44 a time-delayed signal $f_r'(t-\tau_w)$, which is appropriately converted to analog form at converter 49. The output of converter 49 is once more fed to multiplier 50 where it is multiplied by the reflection coefficient R and again fed to one input of summation network 57 where it is added to the undelayed intermediate signal $f_r'(t)$ from register 43. The output of summation network 57 thereupon provides the output signal $f_p(t)$ via switch 58 which is placed for that purpose in its closed position.

A detailed implementation of the overall processing system shown by the simplified block-diagram version shown in FIG. 7 is described with reference to the partial block diagram and partial schematic diagram of the overall system shown in FIG. 8. In FIG. 8 the received input signal $f_r(t)$ is fed to a signal conditioner 59 which includes an appropriate low pass filter (not shown) having, for example, in a preferred embodiment, a high frequency cut-off point at approximately 150 Hz. Such a filter removes any spurious signal components having frequencies above that value. Since the frequencies of interest will generally be less than 150 Hz., it is clear that such a low pass filter avoids any complications which may be introduced because of the presence of such extraneous higher frequency components.

The filter is followed by a suitable gain-control circuit (not shown) for providing an adjustable gain of the filtered input signal. Thus, as is well known such circuit may include a suitable combination of fixed and variable resistors so that the level of the input can be appropriately adjusted for the most effective use of the digital computation units employed in the remaining signal processing equipment, as explained more fully later. The output of signal conditioner 59 is fed to an analog to digital converter (ADCON) 60 which thereupon converts the input signal to digital form which in a particular embodiment, for example, may be one having eight significant bits in amplitude. During the conversion of the input signal from analog to digital form, switch 70 is placed in the position as shown in the figure.

The received signal, now in digital form, is thereupon loaded into a pair of digital shift registers 61 and 62 via buffer storage register 109. Buffer register 109 is utilized to assure that a correct digital value representative of the input signal is always made available for insertion into the digital shift registers 61 and 62 and avoids the need for providing elaborate circuitry for synchronizing the operation of ADCON 60 and shift registers 61 and 62. In the particular embodiment shown and discussed herein, registers 61 and 62 each may be arranged, for example, to handle eight significant bits in amplitude and to be 1000 time bits long. During the loading process, switches 71, 72 and 73 are all in the positions as shown in the figure.

Once the loading of shift registers 61 and 62 has been completed, the computation of the autocorrelation function begins. In order to obtain the initial value of the autocorrelation function (i.e., the value of $\phi_{rr}(\tau)$ at $\tau=0$), the contents of the shift registers 61 and 62 are converted to analog form through digital to analog converters (DACONS) 63 and 64, respectively, and the outputs thereof are fed to the input terminals of a multiplier 65. During computation of the autocorrelation function the output of shift register 61 represents the function $f_r(t)$ and the output of shift register 62 represents the function $f_r(t-\tau)$. Thus, in computing the initial value of the autocorrelation function (i.e., at $\tau=0$), the inputs to multiplier 65 are each the same, namely $f_r(t)$. The output of multiplier 65 is then fed to an integrator 67 where the required integration for producing such initial value is performed. An appropriate sample and hold circuit 68, maintains the amplitude of such function at the computed value until the value of the autocorrelation function at the next point in time is computed.

In order to compute the next value of the autocorrelation function, the system must again compute the functions $f_r(t)$ and $f_r(t-nT)$ where for such computation, T represents a time delay equal to one time bit (i.e., $\frac{1}{1000}$ of the shift register computer time length). For this purpose switches 71 and 73 are moved to their alternate positions so as to complete the closed loop paths indicated by paths 78 and 79 directed from the outputs of shift registers 61 and 62, respectively, to their inputs through switches 71 and 73, respectively. Thus, as $f_r(t)$ is fed back through path 78, shift register 61 is again loaded with the digitalized form of such signal.

Closed loop 79, however, is arranged to feed the output $f_r(t)$ of shift register 62 via a switch 77 through a time delay register 75 which delays such signal by one time bit. The output of time delay register 75 is thereupon fed via switches 72 and 73 back to the input of shift register 62 so that it is thereupon loaded with the digitalized form of the received signal which has been delayed by one bit, such signal being conveniently represented, as discussed above, by the expression $f_r(t-nT)$, where $n=0, 1, 2, 3 \ldots, N$, and N is the bit length of such registers (in the specific embodiment discussed $N=1000$) and T is equal to the ratio of the load time of the shift registers to the bit length of such registers. The load time of the shift registers (i.e., the time required to load an incoming signal completely into the register) is set in accordance with the desired two-way penetration time which later time is defined as the travel time of a pulse of sound energy from the energy source to the deepest sedimentary layer interface of interest and back to the receiver. In one specific embodiment of the invention, for example, the two-way penetration time may be set at different values, for example, at one second, two seconds, three seconds, and five seconds, depending on the estimated depth of the deepest sedimentary layer expected to be examined. Thus, if the load time for the shift registers is made equal to the penetration time setting, the shift registers are substantially fully loaded with that portion of the return signal which is of particular interest and such registers are used most effectively. Once the reloading of shift registers 61 and 62 has been completed, their contents $f_r(t)$ and $f_r(t-nT)$, respectively, are again converted to analog form through digital to analog converters 63 and 64, respectively, and the value of the autocorrelation function is computed by multiplier 65 and integrator 76 (such value being calculated at discrete points in time separated by a time interval equal to one time bit).

Thus, the recirculation of the contents of shift registers 61 and 62 proceeds for the calculation of each such subsequent discrete value of the autocorrelation function so that, during each recirculation through the closed loop paths, the content of shift register 61 is not delayed, while the content of shift register 62 is delayed each time by one additional bit. In such manner the autocorrelation function in the particular embodiment shown is computed at 1000 points in time each separated by one time bit. The autocorrelation function $\phi_{rr}(\tau)$ is, thus, obtained in analog form at the output of sample and hold circuit 68 and is fed through switches 106 and 70 to analog to digital converter 60. During such process, switch 106 is in its position as shown in the figure while switch 70 is in its alternate position having been switched thereto for this purpose when the input received signal $f_r(t)$ was initially entirely loaded into shift registers 61 and 62.

The autocorrelation function $\phi_{rr}(\tau)$ is converted back to digital form at the output of ADCON and buffer register 109 and thereupon fed to storage registers 81 and 82, identified as $\phi_{rr}(\tau_W)$ storage register and $\phi_{rr}(2\tau_W)$ storage register, respectively. Storage register 81 in conjunction with analog comparator circuit 83 operates to select the maximum negative amplitude of the input autocorrelation function, $\phi_{rr}(\tau)$, such amplitude corresponding to negative impulse 33 shown in FIG. 4. In this operation analog comparator circuit 83 compares each new analog value of $\phi_{rr}(\tau)$, as fed from the input to ADCON 60, with the value stored in storage register 81 which value is converted to analog form by the digital to analog (DACON) converter 85. If the new value of $\phi_{rr}(\pi)$ is more negative than the register's content at that time, such value is inserted into storage register 81 to replace the previous value. When the complete autocorrelation function $\phi_{rr}(\tau)$ has thus been examined, storage register 81 then contains a signal the amplitude of which represents the largest negative value assumed by $\phi_{rr}(\tau)$. In the case at hand such value occurs at $\tau=\tau_W$.

Similarly, the combined operation of storage register 82, digital to analog converter 86, and analog comparator circuit 84 operates to store the largest positive value assumed by $\phi_{rr}(\tau)$ in storage register 82, which value corresponds to positive impulse 34 of FIG. 4 at $\tau=2\tau_W$.

In order to avoid the noise correlation problem at $\tau=0$ which produces an incorrect computation of the amplitude of $\phi_{rr}(\tau)$ at such point, it is desirable that the amplitude value of the autocorrelation function at or relatively near $\tau=0$ not be utilized in making the above calculation. For this purpose a store command generator 120 is used to control the operation of storage registers 81 and 82 and is arranged to inhibit the loading of storage registers 81 and 82 for values of $\tau$ at or near $\tau=0$ and not to inhibit such loading thereafter. Such inhibition characteristic must be coordinated with the load time (and, consequently, the two way penetration time setting) of the shift registers, since the portion of $\phi_{rr}(\tau)$ which is thereby inhibited will change with a change in such setting. The operation of store command generator 120 is controlled by providing an appropriate two-way penetration time scale factor therefor, as shown schematically by the insertion of one of the resistors 111, 112, 113 or 114 via a manual selection switch 115 adapted to be set at one of four positions corresponding to two-way penetration time setting of one, two, three and five seconds as shown.

The amplitude values of $\phi_{rr}(\tau)$ at $\tau_W$ and at $2\tau_W$, as stored in registers 81 and 82 and as converted from digital to analog form by digital to analog converters 85 and 86, respectively, are thereupon being fed to the input of a divider circuit 87 in which the value of $\phi_{rr}(\tau)$ at $\tau=2\tau_W$ is divided by he value of $\phi_{rr}(\tau)$ at $\tau=\tau_W$. The output of divider 87 is thereupon fed to piecewise linear amplifier 88, the operation of which is well known in the art, which amplifier effectively multiplies such output by a suitable factor in accordance with the piecewise linear approximation shown by solid line segments 37*a* and 37*b* in FIG. 5. Thus, the output of piecewise linear amplifier 88 produces an output in analog form representing the reflection coefficient R for values of K from 0 to 1.0 in accordance with Eq. 10. Such output is appropriately fed to one input of multiplier 65 through switch 105 which at the time of such operation is switched to its alternate position.

In addition to the calculation of R performed during the above described operation, the time period between the initial value of $\phi_{rr}(\tau)$ at $\tau=0$ and the maximum negative value of $\phi_{rr}(\tau)$ at $\tau=\tau_W$ is computed and stored in storage register 95.

After the calculation of $\tau_W$ and R, switch 71 at the input of shift register 61 is switched to its alternate position so that the content of digital shift register 61, representing $f_r(t)$ in digital form, is again loaded into digital shift register 62 as well as into shift register 61. Upon completion of such reloading, the contents of both shift registers continue to re-circulate around closed loops 78 and 79, the time delay register 75 in clsed loop 79 being employed to delay the contents of shift register 62 relative to the contents of shift register 61 by one bit for each closed loop re-circulation.

Such time delay process continues until the total delay of the signal in register 61 equals the value of $\tau_W$ stored in $\tau_W$ storage register 95. At that point, the time delay register 75 is bypassed by changing switches 72 and 77 to their alternate positions so that any further recirculation produces no further relative time displacements of the contents of the two shift registers. The contents of each shift register continue to recirculate (with a constant time delay difference of $\tau_W$ between them) until the total number of recirculations is equal to the bit length of the registers (i.e., a recirculation count of 1000 for the particular embodiment under discussion). In this way the overall calculation time, i.e., the time required to produce the calculated $f_p(t)$ from the incoming $f_r(t)$ remains constant even when the computed $\tau_W$ time delay varies. Maintaining a constant overall calculation time is desirable, particularly when plotting the final output signal $f_p(t)$ on a graphical recorder, for example. Thus, if such recorder is moving at a constant rate and each new value of $f_p(t)$ is also calculated at a constant rate, the recorder and the processing system can be suitably synchronized to provide a meaningful display of the output signal.

After the desired recirculation of the two signals $f_r(t)$ and $f_r(t-\tau_W)$ in shift registers 61 and 62, respectively, such signals are then converted to analog form via digital to analog converters 63 and 64, respectively. The output of converter 63 is fed directly to one input of a summation network 66 while the output of converter 64 is fed to one input of multiplier 65, the other input of which is fed with the calculated signal R from piecewise linear amplifier 88 via switch 105 now placed in its alternate position. The output of multiplier 65 is thereupon fed to a second input of summation amplifier 66. During this mode of operation switch 107 is switched to its open position.

The output of summation amplifier 66 thereupon represents the intermediate signal $f_r'(t)$ and such signal is thereupon fed to analog to digital converter 60 via switch 106, which at this time is switched to its alternate position, and switch 70, which is also in its alternate position. During this mode of operation, switch 108 at the input of output amplifier 69 remains in its normally open position as shown in the figure. The signal $f_r'(t)$ is thereupon converted from an analog form at the output of summation amplifier 66 to a digital form available at the output of buffer register 109 and is thereupon loaded into shift register 61 and shift register 62 through switch 71, which at this time is switched back to its position as shown in FIG. 8 and through switch 73 which is also in the position as shown in the figure. Once $f_r'(t)$ is loaded into shift registers 61 and 62, switches 71 and 73 are again switched to their alternate positions so that the contents of each shift register are recirculated through closed loop paths 78 and 79, as before. The content of shift register 62 is again recirculated through time delay register 75 until it again achieves an overall time delay equal to $\tau_W$, at which time switch 72 is switched to its alternate position so that no further relative time displacements of the contents of the shift registers occurs.

The contents of shift registers 61 and 62 [that is, $f_r'(t)$ and $f_r'(t-\tau_W)$] are recirculated until the total number of recirculations equals the bit length of the registers and are then converted to analog form via digital to analog converters 63 and 64, the outputs of such converters again being fed to summation amplifier 66 and multiplier 65, respectively. The signal $f_r'(t-\tau_W)$ is multiplied by R at multiplier 65, and the output of multiplier 65 is fed to summation network 66 as before. The output of summation network 66 thereupon represents the desired primary waveform signal $f_p(t)$ which is then fed to output amplifier 69 through switch 108, now placed in its alternate closed position (switch 106 having reverted back to its position as shown in FIG. 8). Such signal is thereupon fed from output amplifier 69 to an output terminal 110 where it is available for supplying to an appropriate graphical recording or other display apparatus.

All of the computations described above with reference to the processing of $f_r(t)$ to obtain $f_p(t)$ in the particular embodiment under discussion are performed within the time period between the receipt of each of the successively received signals resulting from successive periodically emitted impulses from the acoustic energy soruce being towed by the ship. Each such computation is, thus, completed before the next reflected energy signal is received. Subsequently the next received signal is again processed in the same manner so that a continuous geological profile can be recorded in real time on ship board.

During the loading of digital shift registers 61 and 62, the input received signal is sampled at 1000 time intervals (corresponding to the 1000 bit length of each register in the specific embodiment shown). The sampling is performed at one of a plurality of selectable rates which correspond to different two-way penetration times. For this purpose, appropriate clock pulse circuitry, not shown but well known in the art, is provided to produce suitable clock pulses at rates corresponding to the desired two-way penetration time settings. As discussed above, in one specific embodiment of our invention, for example, the signal is capable of being sampled at 1000 time intervals at one of four selectable sampling rates corresponding to two-way penetration times of 1, 2, 3 and 5 seconds.

In the particular embodiment of our invention discussed here, it is preferable to utilize so-called "dynamic" digital shift registers of the MOS type rather than other more conventional present day state-of-the-art "static" registers. However, in utilizing such dynamic shift registers as those available at present, such registers must be operated at relatively high clock rates when compared to the sampling rates which are used in our inventive system. Thus, one specific type of register of this type which we have found useful and available at present must use clock rates no lower than 1000 Hz., even though the sample rates, as discussed above, are well below that frequency.

In order to operate such shift registers with the lower sampling rates, we have utilized a unique scheme which we refer to as a "flywheel" technique which allows the use of dynamic shift registers having high clock rates even though the input signals thereto are sampled at relatively much lower rates. In the operation of such a "flywheel"

scheme for high speed dynamic shift registers, the entire contents of each shift register are circulated once around closed loops 78 and 79 between every sample of the input received signal. Thus, each shift register is operating at its required high clock rate by the continual loading and unloading of its entire content between input samples, which samples may be taken at a rate as low as $\frac{1}{1000}$ of the operating clock rate of the shift register itself.

In order to make all the above computations in the order specified, appropriate control logic circuitry 94 is utilized to set the computing elements into operation, to provide the desired reference time points, to perform the desired switching operations and to reset the elements after each computation mode. Since appropriate configurations and the operation of such circuitry are well known to those skilled in this art, this circuitry is not described in further detail here. Such control logic circuitry is itself set into operation by an appropriate input trigger signal which is obtained when the received signal is initially received at the receiver 17.

Figure 8:
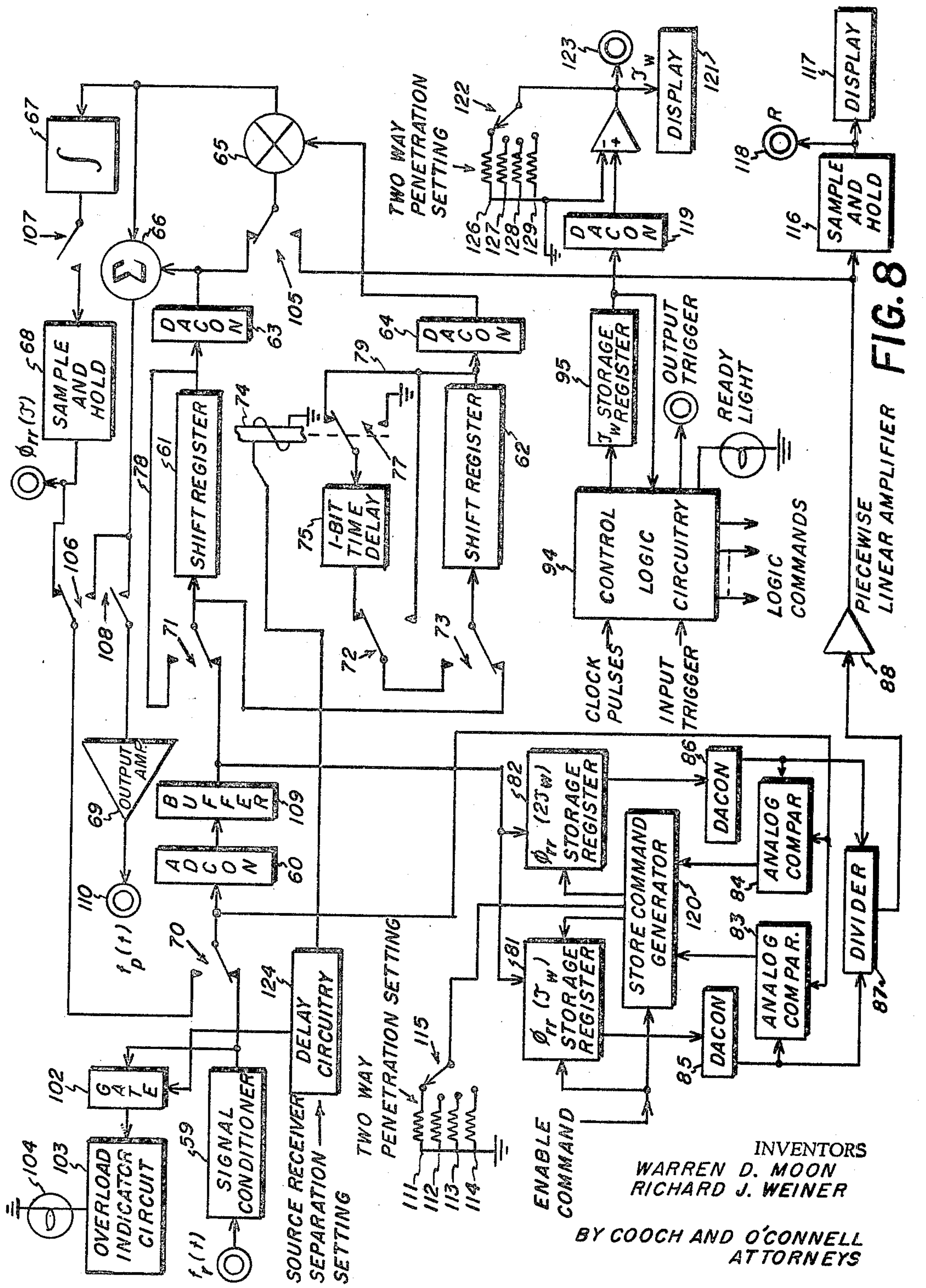
FIG. 8 shows a more detailed version of the signal processing system of the invention shown in FIG. 7.
Figure 9:
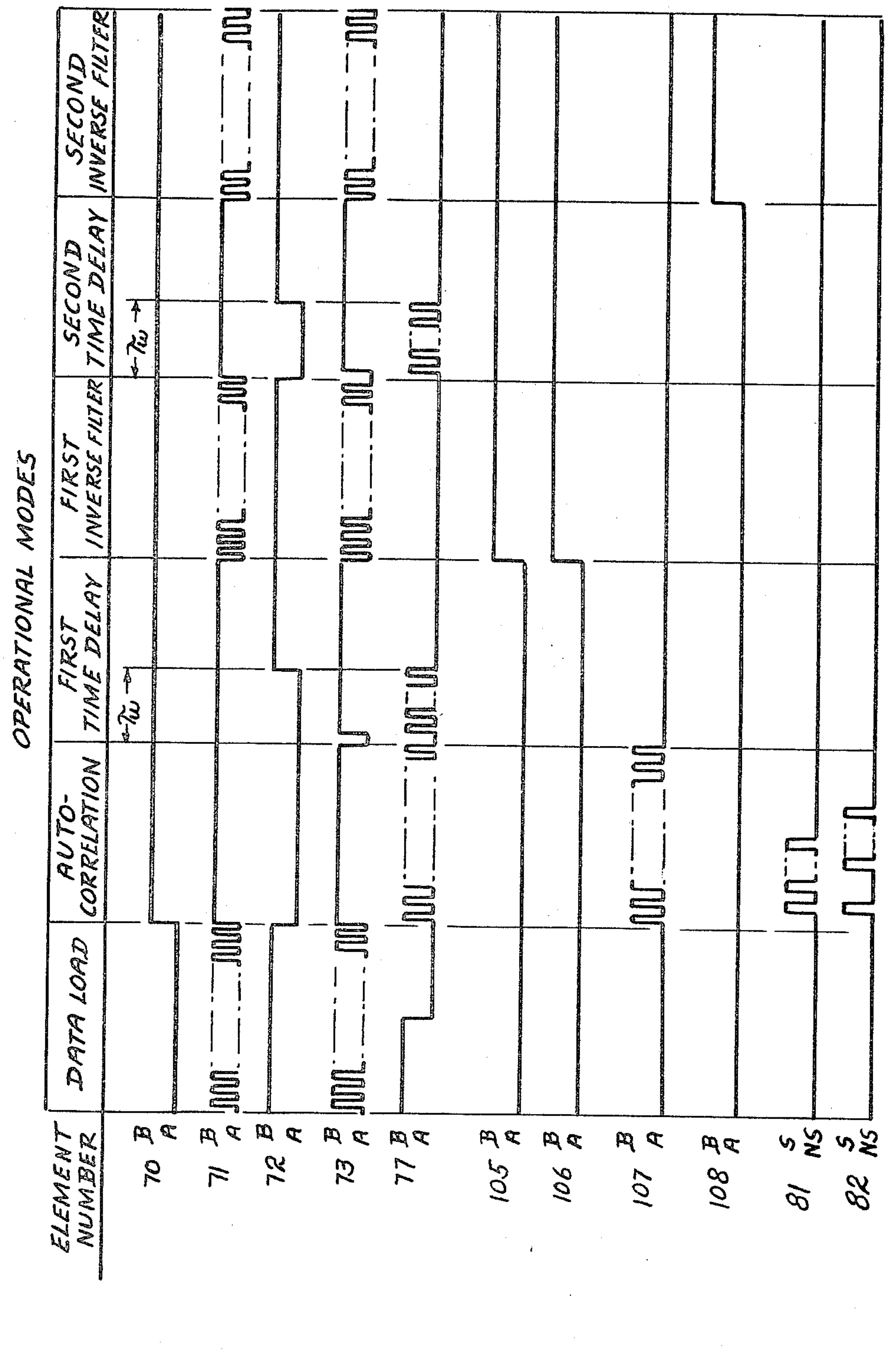
FIG. 9 shows a timing diagram depicting the sequence of operations of the system shown in FIG. 8.

The timing diagram of FIG. 9 summarizes graphically the operation already described above with reference to FIG. 8 by showing the sequence of operation of the various elements in FIG. 8 controlled by control logic circuitry 94 during each operating mode of the overall system. In accordance with the above discussion of FIG. 8, the system can be thought of as having essentially six operating modes, identified in FIG. 9 as Data Load mode, Autocorrelation mode, First Time Delay mode, First Inverse Filter mode, Second Time Delay mode, and Second Inverse Filter mode. With reference to the switching elements listed in FIG. 9, the designation "A" represents the switch position, as shown in FIG. 8, and "B" represents the alternate position thereof.

During the Data Load mode of operation the input signal is loaded into shift registers 61 and 62 which are operated in accordance with the "flywheel" technique disclosed immediately above. Thus, each sample of the input signal is received when switches 71 and 73 are at their "A" positions and is circulated once around each of the closed loops in each register, when switches 71 and 73 are at their "B" positions before the next sample is received, so that switches 71 and 73 appropriately alternate between these positions at the operating rate of the registers, as previously described.

During the Autocorrelation mode, switch 70 is in its alternate position (where it effectively remains during the rest of the operational modes). The contents of the shift registers are continually re-circulated (switches 71 and 73 being in their alternate positions), as previously described, the contents of shift register 62 being delayed by the desired one-bit time delay during each recirculation. In this mode, switch 77 is appropriately switched at the circulating rate of the shift registers for such purpose. As the contents of the shift registers are thus re-circulated, their outputs are fed to the multiplier and integrator combination, as previously explained, so as to calculate each point of the autocorrelation function, the operation of switch 107 being appropriately synchronized for this purpose with that of switch 77, as shown.

During the First Time Delay mode of operation, the contents of shift register 61 are loaded into register 62, via the operation of switch 73, and the contents of each are again re-circulated, that of shift register 62 being delayed by one-time bit for each recirculation thereof by the operation of switch 77, as previously described, until its contents are delayed in time with respect to the undelayed re-circulating contents of shift register 61 by an amount equal to the time $\tau_W$, as discussed above. At that time, switch 72 is placed in its alternate position so that further re-circulation in shift register 62 introduces no additional time delay in accordance with the previously mentioned description of FIG. 8.

Following the First Time Delay mode, the outputs of shift registers 61 and 62 are fed during the First Inverse Filter mode to the summation circuit 66 and multiplier 65, respectively, switch 105 being then placed in its alternate position as shown in the timing diagram. Switch 106 is also switched to its alternate position so that the calculation of the signals $f'(t)$ continues, again at the operational rate of shift registers 61 and 62, through the appropriate operation of switches 71 and 73, as shown.

Then, in order to calculate the final output signal $f_p(t)$, the signals are again appropriately operated upon in substantially the same manner throughout the Second Time Delay mode and the Second Inverse Filter mode, as shown in FIG. 9.

The operation of the switching elements described is, thus, suitably controlled through circuitry 94 by the use of well-known clock pulse, digital counting, and matrix switching techniques.

Moreover, as also shown in FIG. 9, and already described above with reference to FIG. 8, the store command signals from store command generator 120 operate to cause storage registers 81 and 82 either to store or not to store, as designated by "S" and "NS" in FIG. 9, an incoming signal (i.e., the autocorrelation signal from buffer 109 during the Autocorrelation mode). Thus, the store command generator inhibits the registers from storing any incoming signals at or near the beginning of the Autocorrelation mode, as explained previously, and thereafter to store the maximum negative input signal and maximum positive input signal by comparing the stored signal with the incoming signal at analogue comparators 83 and 84 and providing "store" command signals only when the incoming signal is larger than that previously stored in registers 81 and 82, as already described above. The "store" command signals are appropriately provided by suitable gating circuitry well-known to those in the art.

As indicated above, the signal conditioner circuitry 59, including a low pass filter and an appropriate gain-adjust circuit, provides a suitable input signal to the system so that the maximum effective capacity of the computational units within the system are utilized and overloading of such units, particularly shift registers 61 and 62, is prevented. In order to provide for optimum use of the system, an overload indication circuit is employed at the output of signal conditioner 59. As shown in FIG. 8, such overload circuit includes a gating circuit 102, the function of which is described in more detail below, and an overload indicator control circuit 103 for appropriately actuating an overload indicator light 104.

Overload indicator control circuit 103 is of a conventional type and provides an output actuation voltage for overload light 104 when the input to such circuit (i.e., the output from signal conditioner 59 via gate 102) exceeds a specified value. In the system of the invention, such value is determined by the operational characteristics of shift registers 61 and 62. Since it is possible to determine, for any particular shift register, the voltage level above which such register will be overloaded, overload indicator control circuit 103 is adjusted to produce a suitable output voltage for actuating overload light 104 when the output from signal conditioner 59 is equal to or exceeds such voltage level.

This circuitry allows the operator to adjust appropriately the gain of the signal conditioner circuitry for optimum operation of the overall system by setting such gain at a value just below that required to produce an overload light indication when the system is in operation. When the gain is adjusted to a value just below such threshold level, the operator is assured that the shift register units are operating essentially at their full capacity.

At the same time gating circuit 102 is utilized to prevent overload indications which may be triggered by that portion of the receiver signal which is received by receiver 17 on a direct path from source 16, such direct path portion normally being received before the reflected portion thereof (only for very shallow water will a part of the reflected signal tend to overlap the direct signal). Since such direct-path signal may normally be at a relatively high level in comparison with the level of the desired reflected signal, gate 102 is adjusted to prevent the passage of such signal portion, while at the same time allowing the passage of the remaining reflected portions of the received signal. Since the time of travel of such direct-path portion depends on the distance separating the receiver and the source, the operation of the gate is controlled by a signal computed in accordance with such source-receiver separation by delay circuitry 124.

It should be noted at the same time, however, that the complete received waveform signal, including both the direct and reflected portions thereof, is applied to shift registers 61 and 62 following its conversion to digital form by analog to digital converter 60. However, during the computation of autocorrelation function signal $\phi_{rr}(\tau)$ an appropriate switching circuit, operated in conjunction with the delay circuitry 105, is utilized in the closed loop path associated with shift register 62. The switching circuit is all solid state with no mechanical parts although it is shown schematically as comprised of a relay circuit which includes relay coil 74 and relay switch 77. The switch is placed in its alternate position from that shown in the figure for the time period containing the initial portion of the received signal. Such operation prevents the passage of the direct-path portion of the received signal in such closed loop path. It is clear that, while the representation of such circuit is shown diagrammatically as a relay for clarity in describing its operation, such circuit may be of solely electronic form and may comprise an appropriate transistor switching circuit.

Thus, while the received signal, including the direct-path portion thereof, is used in shift register 61, the operation of switching circuit 77 in closed loop path 79 provides for the use in shift register 62 only of the reflected portion of the received signal. The presence of the direct portion of the received signal in only one of such pair of shift registers produces an autocorrelation function signal equal to zero (i.e. there is no correlation) for the time period represented by the time duration of such direct portion. Thus, the operation of shift registers 61 and 62 in the computation of the autocorrelation function signal $\phi_{rr}(\tau)$ is not affected so long as such direct portion is not utilized in both shift registers simultaneously.

The values of the reflection coefficient R and the two-way travel time $\tau_W$ may be appropriately monitored by suitable display devices as desired. As indicated in the figure, the reflection coefficient at the output of piecewise linear amplifier 88 may be fed through a sample and hold circuit 116 to a display unit 117 which may be, for example, a meter placed on a front panel of the overall unit. An additional output jack 118 is also made available for feeding the same signal to other suitable display units. Similarly, the output of the $\tau_W$ storage register 95 may be converted to analog form by digital to analog converter 119 and fed to an appropriate display unit 121 such as a panel meter. Appropriate scale factoring of $\tau_W$ in accordance with the two-way penetration time setting is arranged through the use of resistor combination 126, 127, 128 and 129, and manually operated switch 122. An additional output jack 123 is also made available for feeding $\tau_W$ to other suitable display units.

Although the particular embodiment of the invention, the operation of which is discussed above utilizes a method wherein the quantities R and $\tau_W$ are repeatedly recomputed for each incoming pulse of information, it is possible to arrange the system to operate so as to provide such computations at a slower rate. For example, where the values of R and $\tau_W$ are not expected to change rapidly it may be preferable to set up the system so as to provide a new calculation of R and $\tau_W$ only for every other incoming pulse and to utilize the previously calculated values of these quantities in the interim calculations being performed to produce the desired output signal. Moreover, the computed values of R and $\tau_W$ may be held and utilized for even longer interim periods through appropriate use of suitable control logic commands for operating the switching circuitry involved.

The switching circuitry of the embodiment depicted in the figures has been shown only schematically as being substantially mechanical or electromechanical in form. It is clear that the switches thus shown and discussed, which switches are operated through appropriate logic commands from control logic circuitry 94, may preferably be in the form of appropriate electronic circuitry, for example, well-known electronic switching circuits of the solid state type.

Examination of the overall system, as shown in FIGS. 7 and 8, reveals the basic inventive concept of operation relative to the functions performed by the digital and analog computation means used therein. The digital computational elements perform essentially the time delaying, information storage, and logic control operations required in the processing of the incoming signal. Such operations are involved in the computation of the autocorrelaion function in which shift registers 61 and 62 store the incoming signal in digital form and through appropriate recirculation of the contents of such registers provide the successive time delays required. Further, in the computation of the reflection coefficient R and the time delay $\tau_W$, storage registers 81, 82, and 95 appropriately store amplitude and time quantities as required. Shift registers 61 and 62 thereupon are again utilized in the implementation of the desired filtering operation by appropriately storing and recirculating both the input signal $f_r(t)$ and the intermediate signal $f_r(t)$ in the manner described above.

On the other hand, the analog computational elements are utilized to perform various mathematical operations required in the processing of the incoming signal. For example, multiplications and integrations in the computation of the autocorrelation function and multiplications, additions and substractions required during the filter operation are performed by analog multiplier 65 and summer 66. In addition, in the computation of the reflection coefficient R, division is performed by analog divider 87 and multiplication of the resulting ratio K by an appropriate factor in accordance with the above-defined piecewise, linear approximation is performed in an analog mode by piecewise linear amplifier 88.

Hence, the invention broadly described provides a unique, and an optimized combination of digital and analog computation means wherein the former are used for performing time delay, information storage, and logic control operation and the latter are used for performing mathematical operations. Appropriate converters, of course, are supplied to change the signal from digital to analog forms, and vice versa, where needed. The combination thus described provides an extremely efficient utilization of both digital and analog means in the overall system processing operation.

The particular embodiment of the invention shown and described herein shall not be considered to represent the only embodiment as variations of the configurations shown will occur to those skilled in the art within the scope of the invention. Hence, the invention is not to be construed as limited to the particular embodiment described herein except as defined by the appended claims.

What is claimed is:

1. A system for processing a marine seismic signal which includes a primary signal and at least one water layer reverberation signal, said system comprising processing means responsive to said seismic signal for continuously and automatically producing two parametric signals representative of the two-way travel time $\tau_W$ of a sound wave in a water layer and of the acoustical reflection coefficient $R$ at the bottom of said water layer; and filter means responsive to said seismic signal and to said parametric signals for producing in real time an output signal in which the effects of said water layer reverberation signal are eliminated, said filter means having filter characteristics which are substantially the inverse of the filter characteristics of said water layer, said water layer being characterized in the frequency domain by the expression $$(1+Re^{-j\omega\tau_W})^{-2}$$

2. A system for processing a marine seismic signal in accordance with claim 1 wherein said filter means includes means responsive to the $\tau_W$ parametric signal and to said seismic signal for time delaying said seismic signal relative to itself by $\tau_W$;

means for multiplying said time delayed seismic signal by R to produce a scaled seismic signal;

means for summing said seismic signal with said scaled seismic signal to produce an intermediate signal;

means responsive to said $\tau_W$ parametric signal and to said intermediate signal for time delaying said intermediate signal relative to itself by $\tau_W$;

means for multiplying said time delayed intermediate signal by R to produce a scaled intermediate signal; and means for summing said intermediate signal to said scaled intermediate signal to produce an output signal in which the effects of said water layer reverberation signal are eliminated.

3. A system for processing a marine seismic signal in accordance with claim 1 wherein said processing means includes means responsive to said seismic signal for producing a signal representing the autocorrelation function thereof;

means responsive to said autocorrelation function signal for continuously and automatically producing said parametric signals.

4. A system for processing a marine seismic signal in accordance with claim 3 wherein said autocorrelation function signal has a plurality of distinguishable negative and positive peaks and wherein said parametric signal producing means further includes means responsive to the amplitudes of any two of said peaks for producing R; and means for determining the time difference between any two of said peaks to produce $\tau_W$.

5. A system for processing a marine seismic signal in accordance with claim 4 wherein said R-producing means includes an analog divider for producing the ratio of the amplitudes of any two of said peaks;

a non-linear amplifier for scaling said ratio signal to produce R; and said $\tau_W$-producing means includes means for determining the time difference between the times of occurrence of the initial value and the first negative peak value of said autocorrelation function signal to produce $\tau_W$.

6. A system for processing a marine seismic signal in accordance with claim 3 wherein said autocorrelation function signal producing means includes a pair of digital shift registers into each of which said seismic signal in digital format is loaded;

a closed loop path provided for each of said shift registers for recirculating the contents of said shift registers;

a time delay shift register positioned in one of said closed loop paths for delaying the recirculating content of one of said shift registers by a predetermined time period each time said content thereof is recirculated about said closed loop path;

a multiplier for continuously multipliyng the contents of said shift registers as said contents are continuously recirculated;

an integrator for integrating the output of said multiplier to produce a point-by-point calculation of said autocorrelation function signal.

7. A system for processing a marine seismic signal in accordance with claim 6 wherein said multiplier and said integrator operate in an analog mode, said system further including analog to digital converter means for converting said seismic signal into digital format for loading into said shift registers; and digital to analog converter means for converting the contents of said shift registers from digital to analog format.

8. A system for processing a marine seismic signal in accordance with claim 2 wherein said time delaying means includes a pair of digital shift registers for establishing said relative time delays and wherein said multiplying means and said summing means operate in an analog computation mode, said system further including analog to digital converter means for converting said seismic signal and said intermediate signal from analog to digital format; and digital to analog converter means for converting said relative time delayed signals from digital to analog format.

9. A system for processing a marine seismic signal in accordance with claim 5 and further including analog comparator means for comparing successive values of said autocorrelation function signal;

storage means for storing two selected peak signals of said autocorrelation function signal in digital format in response to the comparisons performed by said analog comparator means; and digital to analog converter means for converting said two selected peak signals from digital to analog format for use in said analog divider.

References Cited

UNITED STATES PATENTS

| | | | |
|---|---|---|---|
| 3,131,375 | 4/1964 | Watson | 340—15.5 |
| 3,136,974 | 6/1964 | Sirks | 340—15.5 |
| 3,303,335 | 2/1967 | Pryor | 340—15.5 |

RICHARD A. FARLEY, Primary Examiner

C. E. WANDS, Assistant Examiner